US010855062B2

(12) United States Patent
Hansen et al.

(10) Patent No.: US 10,855,062 B2
(45) Date of Patent: Dec. 1, 2020

(54) CABINET WITH PRESSURE RELIEF MEANS

(71) Applicant: VESTAS WIND SYSTEMS A/S, Aarhus N (DK)

(72) Inventors: Kenneth G. Hansen, Kjellerup (DK); Hans Christian Bisgaard-Clausen, Holstebro (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/340,074

(22) PCT Filed: Sep. 27, 2017

(86) PCT No.: PCT/DK2017/050311
§ 371 (c)(1),
(2) Date: Apr. 5, 2019

(87) PCT Pub. No.: WO2018/065017
PCT Pub. Date: Apr. 12, 2018

(65) Prior Publication Data
US 2020/0059074 A1 Feb. 20, 2020

(30) Foreign Application Priority Data
Oct. 7, 2016 (DK) ................................ 2016 70788

(51) Int. Cl.
H02B 1/28 (2006.01)
H02B 1/56 (2006.01)
(Continued)

(52) U.S. Cl.
CPC ............. H02B 13/025 (2013.01); H02B 1/28 (2013.01); H02B 1/565 (2013.01)

(58) Field of Classification Search
None
See application file for complete search history.

(56) References Cited

U.S. PATENT DOCUMENTS 5,574,624 A * 11/1996 Rennie ..................... H02B 1/56
200/289
5,720,660 A * 2/1998 Benedetto ............... F24F 13/08
454/284
(Continued)

FOREIGN PATENT DOCUMENTS

DE 1121159 B 1/1962
WO 2016156369 A1 10/2016
WO 2018065017 A1 4/2018

OTHER PUBLICATIONS

PCT Written Opinion of the International Searchign Authority for Application No. PCT/DK2017/050311.
(Continued)

Primary Examiner — Courtney L Smith
(74) Attorney, Agent, or Firm — Patterson & Sheridan, LLP

(57) ABSTRACT

A cabinet comprising an outer wall which encapsulates an internal space comprising electronic components, the outer wall having a rupture line forming a release wall portion which by rupturing of the rupture line in response to an increased pressure in the internal space can be released and thereby define an opening forming arc-vent for the internal space. To protect against penetration of objects of a predetermined size into the electronic components, the cabinet further comprises a ventilation-open inner lining arranged in the internal space to cover the opening. If arcing should occur, the increased pressure may rupture the line and the opening will allow venting. In this situation, the inner lining prevents against penetration.

20 Claims, 4 Drawing Sheets

(51) Int. Cl.
*H02B 13/00* (2006.01)
*H02B 13/025* (2006.01)

(56) References Cited

U.S. PATENT DOCUMENTS

| | | | | |
|---|---|---|---|---|
| 6,417,443 | B1* | 7/2002 | Smith | H02B 1/565 174/17 VA |
| 10,326,259 | B2* | 6/2019 | Bellows | H02B 1/30 |
| 10,375,843 | B2* | 8/2019 | Boily | H01H 9/342 |
| 2003/0117045 | A1 | 6/2003 | Byron et al. | |
| 2004/0114289 | A1* | 6/2004 | Eiselt | H02B 13/025 361/62 |
| 2006/0050470 | A1* | 3/2006 | Eiselt | H02B 13/025 361/605 |
| 2013/0143478 | A1 | 6/2013 | Arcos et al. | |
| 2014/0118887 | A1* | 5/2014 | Deb | H02B 13/025 361/622 |
| 2014/0131090 | A1* | 5/2014 | Gingrich | H02B 1/565 174/560 |
| 2015/0036310 | A1* | 2/2015 | Karandikar | H02B 13/025 361/837 |
| 2015/0116911 | A1* | 4/2015 | Sharma | H02B 1/565 361/605 |
| 2016/0042896 | A1* | 2/2016 | Kingston | H01H 33/53 218/157 |
| 2017/0064863 | A1* | 3/2017 | Zeng | H05K 5/0213 |

OTHER PUBLICATIONS

PCT International Search Report for Application No. PCT/DK2017/050311 dated Nov. 17, 2017.
Danish Search Report for Application No. PA 2016 70788 dated Apr. 5, 2017.

* cited by examiner

CABINET WITH PRESSURE RELIEF MEANS

INTRODUCTION

A cabinet is provided for electric components such as converters, switchgear, and transformers, e.g. in a wind turbine.

BACKGROUND

Cabinets for electric components such as for switchgear, converters, transformers and similar low or high voltage applications are made in different shapes and sizes, and to meet different requirements e.g. relative to corrosion resistance, the enclosure's ability to withstand prolonged exposure to humidity or chemical substances, and to the ability to withstand a rapid pressure increase or internal explosion, e.g. caused by arcing in the cabinet. The cabinets are typically rated according to different standards and in accordance with the intended use.

Typically, the cabinets are prepared for arcing by including in the cabinet, an arc-vent. Often, the arc-vent comprises a throttle or damper in a duct leading an excessive pressure out of the cabinet. Due to such arc-vents, even a rapid pressure increase or explosion may take place without destruction of the cabinet, and the potentially hot air is released in a controlled manner at a predetermined location.

Due to the open duct, the requirement regarding prevention of ingress of humidity or solid particles may sometimes be difficult to comply with. For providing a better sealing of the cabinet and still facilitate arc venting, some cabinets are designed to destruct in an intended way upon pressure increase in the cabinet. Such cabinets may provide a sealing enclosure, but they may not provide the required prevention of ingress of solid particles once being destroyed.

DESCRIPTION

It is an object to allow arc venting in electronic encapsulation and to prevent ingress of solid particles into the encapsulation.

Accordingly, in a first aspect, a cabinet is provided with an outer wall encapsulating an internal space comprising electronic components, the outer wall having a rupture line forming a release wall portion which by rupturing of the rupture line in response to an increased pressure in the internal space can be released and thereby define an opening forming arc-vent for the internal space, the cabinet further comprising a ventilation-open inner lining arranged in the internal space to cover the opening and thereby protect the space against penetration of objects into the space when the release wall portion is released.

Due to the rupture line, the outer wall can be released controllably and provide an opening for controlled release of gas. Until it is released, the outer wall forms a sealing encapsulation of the electronic component. Due to the ventilation open inner lining, the outer wall can be released and gas can escape the internal space while a certain degree of encapsulation remains. Accordingly, the combination between a rupture line in the outer wall and the ventilation-open inner lining provides a double encapsulation by which a sealing encapsulation can be converted into a ventilating encapsulation while maintaining a certain level of protection.

The outer wall may e.g. hermetically seal the internal space until the rupture line is ruptured, or the outer wall may e.g. provide a water tight encapsulation, or a vapour tight encapsulation until the rupture line is ruptured.

Herein, the term "ventilation-open inner lining" means any kind of structure which prevents intrusion of solid particles above a certain size and yet allows air to pass.

The ventilation open inner lining may e.g. be made as a mesh of filaments or fibres, as a woven or non woven material of filaments or fibres, as a mesh of fibres or wires, as a grid of overlapping elements, e.g. circular or square bars, e.g. of steel etc. Particularly, the ventilation open inner lining may be heat resistant to resist hot gas escaping from the cabinet.

When the rupture line is ruptured, the ventilation-open inner lining may provide an encapsulation preventing solid particles above a certain size from entering the internal space. The ventilation-open inner lining may e.g. comply with the requirements of a type rating e.g. to an IP protection class, e.g. IP1X corresponding to prevention of entrance of large body parts above 50 mm in diameter, or IP2X prevention of fingers and elements above 12.5 mm in diameter, or IP3X, prevention of tools up to 2.5 mm in diameter, or IP4X from 1 to 2.5 mm, or IP5X which corresponds to a mesh of a size below 1 mm in diameter.

To strengthen the outer wall and to prevent deflection, the cabinet may further comprise a rigid frame at least partly or completely enclosing the opening. The rigid frame may e.g. be formed by bars of a rigid material, e.g. steel, and it may be formed as a separate element which is attached to an inner or outer surface of the outer wall e.g. by welding, or adhesively, by a bolted or riveted connection or in any other way. In one embodiment, both the release wall portion and the remaining wall portion is fixed independently to the frame such that the frame stiffens both portions of the our the outer wall and such that release of the release wall portion leaves the remaining wall portion fixed to the frame.

In one embodiment, the release wall portion forms part of a separate blank of a sheet material attached to the remaining part of the outer wall. In this embodiment, the separate blank can be fixed replaceably by use of the frame.

In one embodiment, the inner lining is fixed to a rigid frame and the separate blank is pressed against either the remaining part of the outer wall in an overlap zone, or against the rigid frame to which the inner lining is fixed. In This embodiment, the pressing of the separate blank can be provided by profiles arranged against an outer surface of the separate blank and attached to the rigid frame by bolts or rivets etc.

The inner lining may particularly be arranged directly adjacent the inner surface of the outer wall such that the outer wall is supported against the outer surface of the inner lining. In that way, the inner lining will support the outer wall and reduce the risk of unintended rupture of the rupture line, e.g. if a user applies pressure against the release wall portion, e.g. by stepping onto that wall portion or by placing heavy items onto that wall portion.

The inner lining may be made such that it provides a higher resistance against deflection than the release wall portion. This means that the inner lining bends less than the release wall portion when the same pressure is applied to the inner lining and to the release wall portion. Further, the inner lining may have a higher tensile strength than the release wall portion, e.g. a tensile strength in the order or 2-3 times the tensile strength of the release wall portion.

The inner lining may also be arranged at a distance from the outer wall. In that case, it may be an advantage if the distance and the material is provided such that the release wall portion is deflectable by elastic or plastic deformation into contact with the inner lining without rupturing the rupture line. In that case, the inner lining may support the outer wall against unintended rupture even though they are arranged at a certain distance.

The release wall portion may be formed e.g. from a blank of a sheet material, e.g. from fibre-reinforced polyester or epoxy, or from a blank of metal, e.g. aluminium or steel. In this embodiment, the rupture line could be formed as a reduced material thickness of the blank. The thickness could be reduced e.g. by use of a laser, by a mechanical process like milling, or chemically. Alternatively, the rupture line could be a line along which the release wall portion and the remaining portion of the outer wall are not coherent. The release wall portion may e.g. form a separate element which is joined to the remaining portion of the outer wall e.g. via the aforementioned frame, or directly, e.g. by adhesion. In one embodiment, the release wall portion is joined to the remaining wall portion by adhesion with an adhesive which is rupturable and thereby forms the rupture line. In another embodiment, the release wall portion is joined to the remaining wall portion by bolts and rivets being fragile and thereby allowing rupturable destruction. In that case the rupture line is formed by the boundary between the release wall portion and the remaining wall portion.

The release wall portion may be replaceable, e.g. by adhesion, welding, or by use of rivets, bolts and similar mechanical fastening means.

The cabinet may particularly be for electronic components forming a low voltage converter or a switch gear.

The cabinet may form a support structure for supporting the cabinet against ground or on a wall. The support structure may e.g. be in the form of a support surface, e.g. constituted by legs, for supporting the cabinet on ground, and the release wall portion may be horizontal wall portion when the cabinet is supported by the support structure. In this orientation, the inner lining supports heavy weight which may be applied to the release wall portion.

The release wall portion forms a central portion within a peripheral portion, and wherein the distance from the central portion to the inner lining is larger than the distance from the peripheral portion to the inner lining. Particularly, the release wall portion may have a folded structure forming e.g. three or four facets extending from a peripheral edge and slightly upwards away from the inner lining. This may strengthen the release wall portion and reduce the risk of damaging the release wall portion if pressure is applied to the outer surface, e.g. if tools is placed on the cabinet or if personnel unintended steps on the outer surface.

The cabinet may e.g. be used e.g. in a wind turbine, e.g. at the foot of the tower or in the nacelle.

In a second aspect, a method is provided for of maintaining a protection against penetration of objects of a predetermined size into electronic components upon arcing by use of a cabinet according to claims 1-12, the method comprising the step of selecting an inner lining in the form of a mesh having a mesh size corresponding to the predetermined size of the object.

BRIEF DESCRIPTION OF THE DRAWINGS

The invention will now be described in further detail with reference to the accompanying drawings in which.

DESCRIPTION OF EMBODIMENTS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
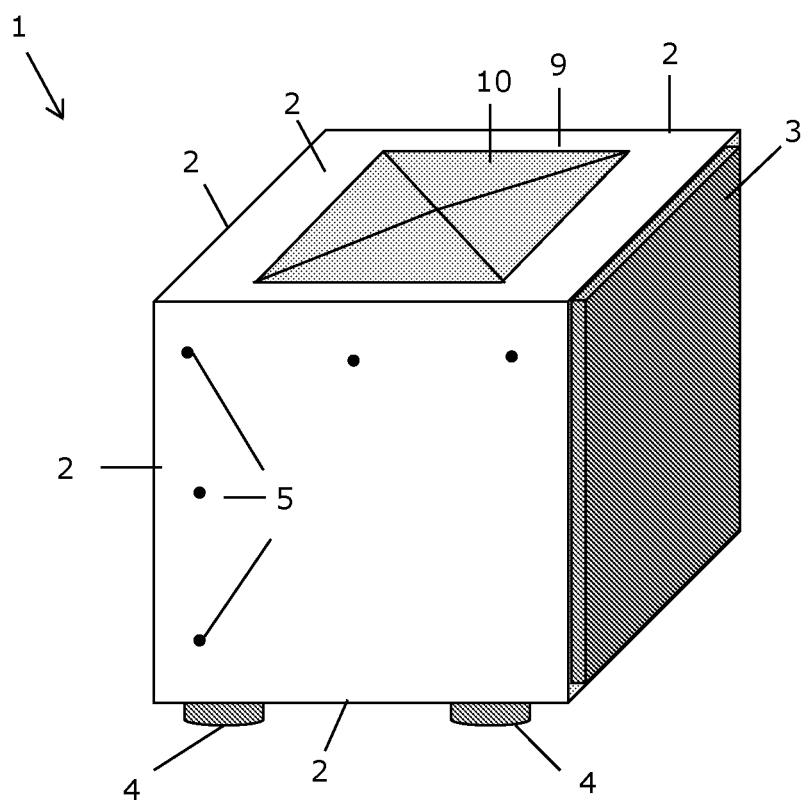
FIG. 1 illustrates a front view of a cabinet according to the invention.

FIG. 1 illustrates a cabinet 1 comprising an outer wall forming five surfaces 2 and a door 3 encapsulating an internal space. The internal space houses different electronic components such as switch gear, converters, transformers, controllers etc.

The cabinet is raised from the floor by the legs 4 forming a support surface for supporting the cabinet on ground.

The cabinet is made from panels of a first sheet material. In the disclosed embodiment, each of the 5 surfaces 2 is constituted by separate panels assembled by rivets 5. Accordingly, wall panels can be replaced individually.

In the embodiment disclosed in FIG. 1, the top panel includes a rupture line 9 forming a release wall portion 10 which can be released in response to an increased pressure in the internal space.

Figure 2:
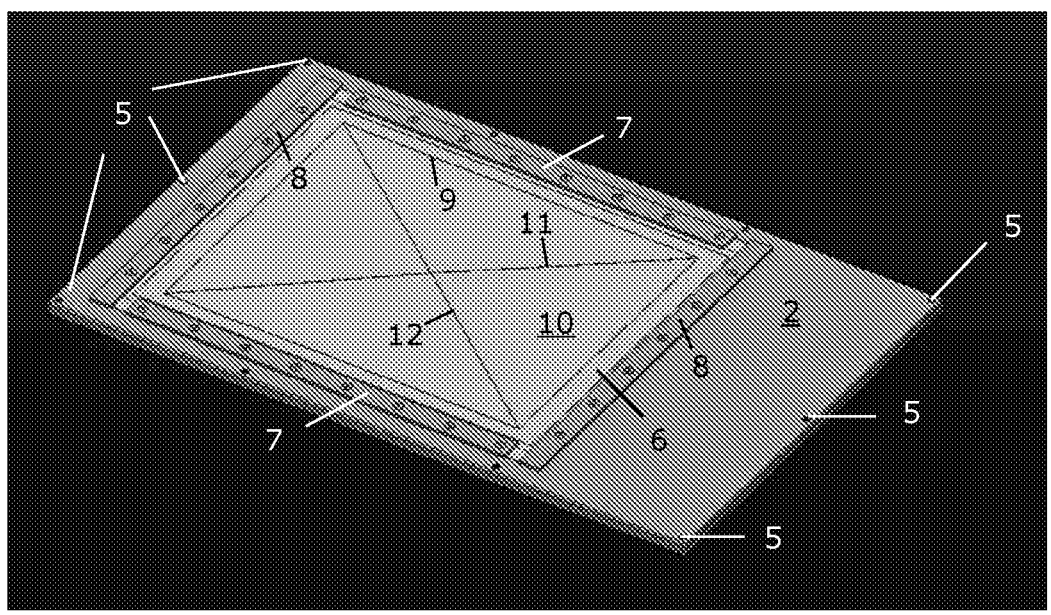
FIG. 2 illustrates a part of the of the outer wall seen from outside the cabinet.

FIG. 2 illustrates an embodiment, where a top panel of the outer wall includes a separate blank 6 forming the release wall portion. The blank 6 is fixed to the panel 2 by the profiles 7 and 8. Since the blank 6 can be separated from the remaining portion of the panel 2 by release of the profiles 7, 8, it can be replaced separately. In this embodiment, the entire panel or only the blank can be replaced if the release wall portion has been released.

The blank 6 forms a rupture line 9 forming a release wall portion 10 which can be ruptured if the pressure in the internal space increases rapidly, e.g. upon arcing in the cabinet. When the release wall portion is released, an open window appears through which the excessive gas can escape and thereby relief the pressure.

The blank 6 is generally flat, but the release wall portion 10 forms a first fold 11 and a second fold 12 whereby a central portion of the release wall portion extends outwards.

Figure 3:
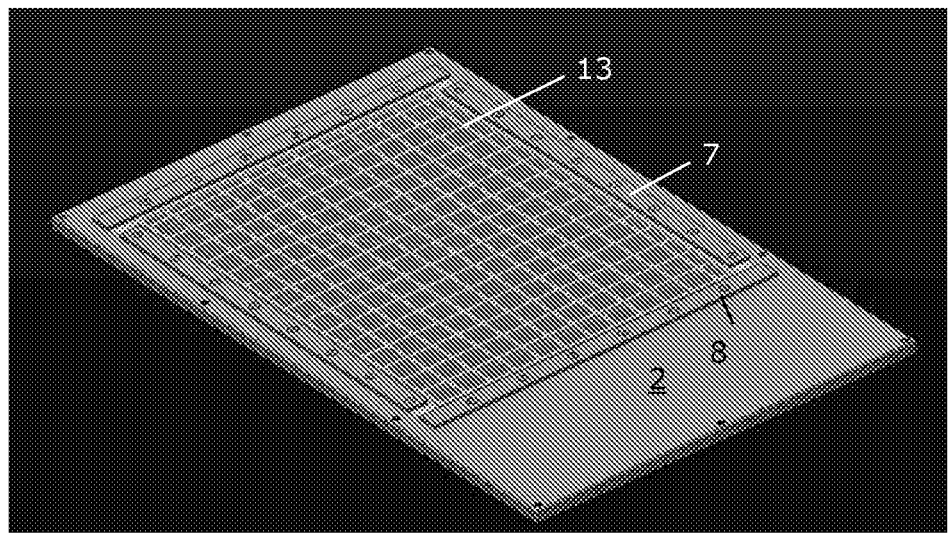
FIG. 3 illustrates a part of the outer wall seen from inside the cabinet.

FIG. 3 illustrates the panel 2 from FIG. 2, seen from outside the cabinet but in a view where the release wall portion is partly transparent thereby illustrating the ventilation-open inner lining 13.

Figure 4:
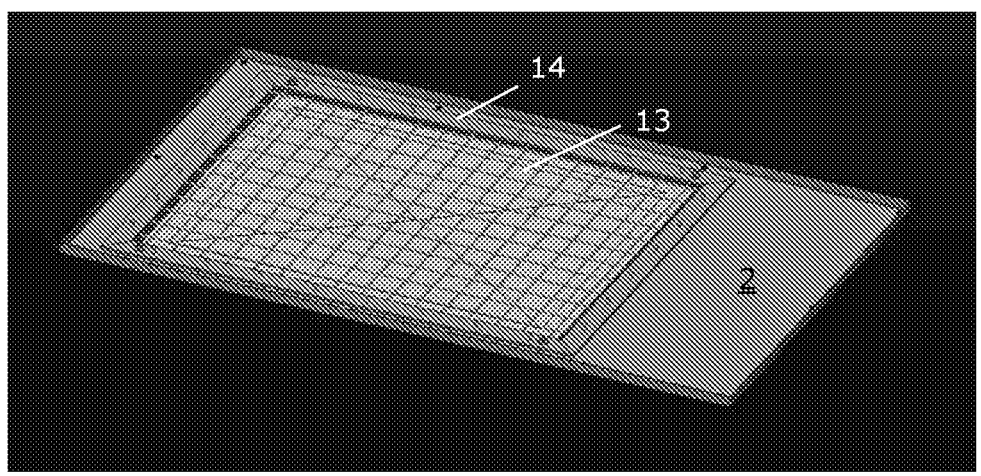
FIG. 4 illustrates a part of the outer wall with a semi-transparent release wall portion.

FIG. 4 illustrates the embodiment of FIG. 2, i.e. in which the top panel includes a separate blank forming the release wall portion. In FIG. 3, the panel 2 is illustrated from the inside of the cabinet. The cabinet includes the ventilation-open inner lining 13 arranged in the internal space and covering the opening which will be formed upon release of the release wall portion. The inner lining 13 is in the shape of a mesh of steel and it protects against penetration of solid objects and thereby provides an IP1X protection. Thus, prevents the entrance of objects with a diameter above 50 mm.

The inner lining 13 is held in place by the rigid frame 14 forming a closed rim about the mesh. The frame and the mesh could be welded to form one single entity.

Figure 5:
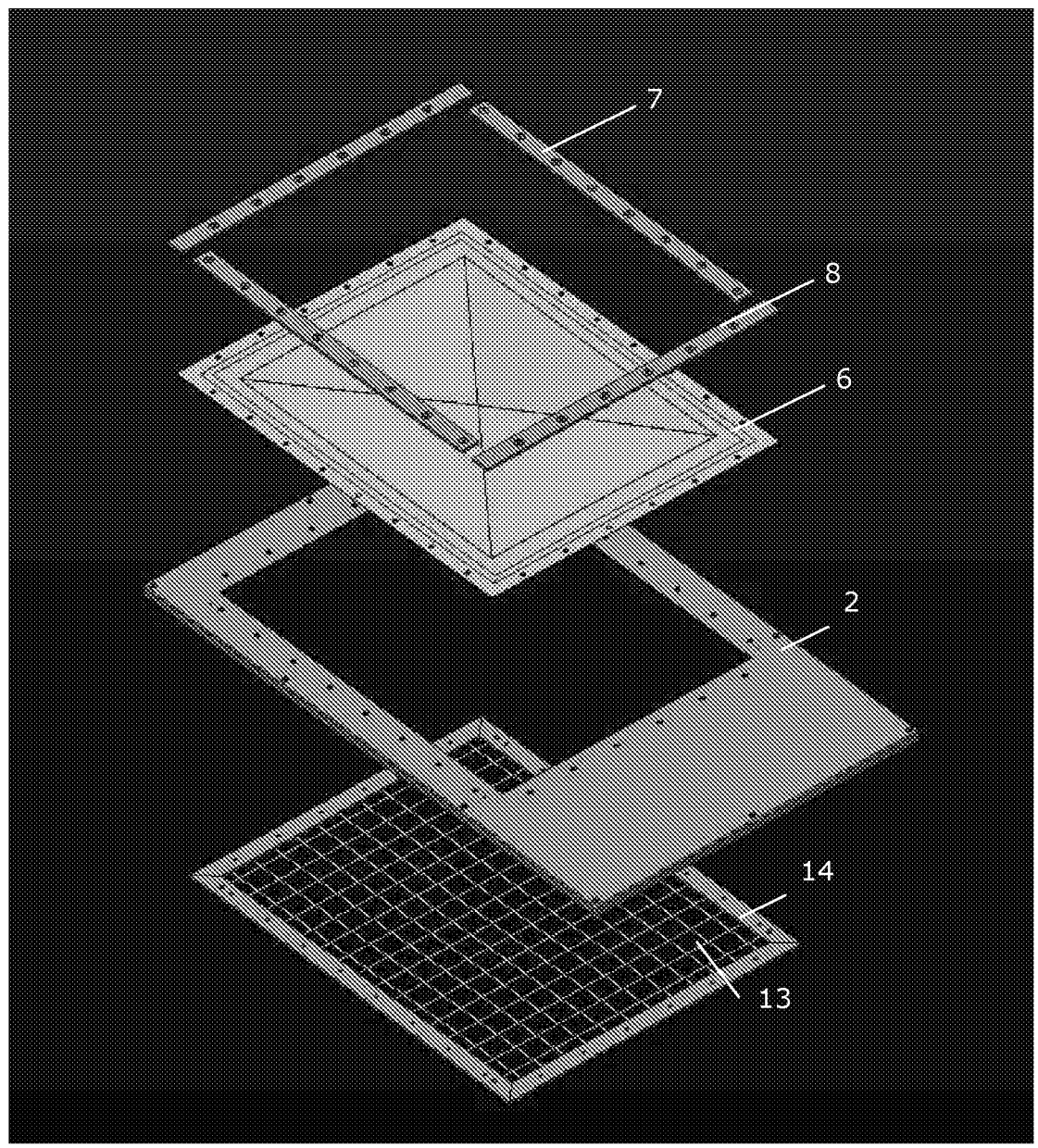
FIG. 5 illustrate details of the assembly of a frame about the opening.

FIG. 5 illustrates an exploded view of the panel 2 and the plate 6, the inner lining 13, the frame 14 and the profiles 7, 8.

Figure 6:
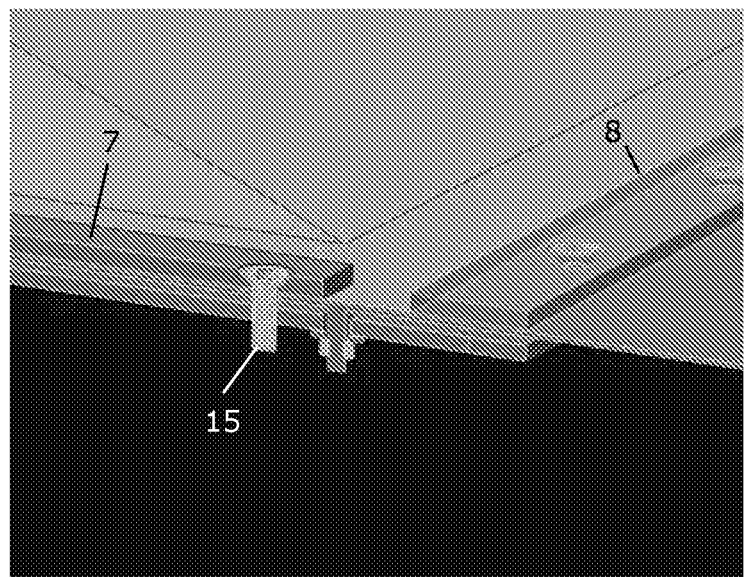
FIGS. 6 and 7 illustrate details of the frame about the release wall portion.
Figure 7:
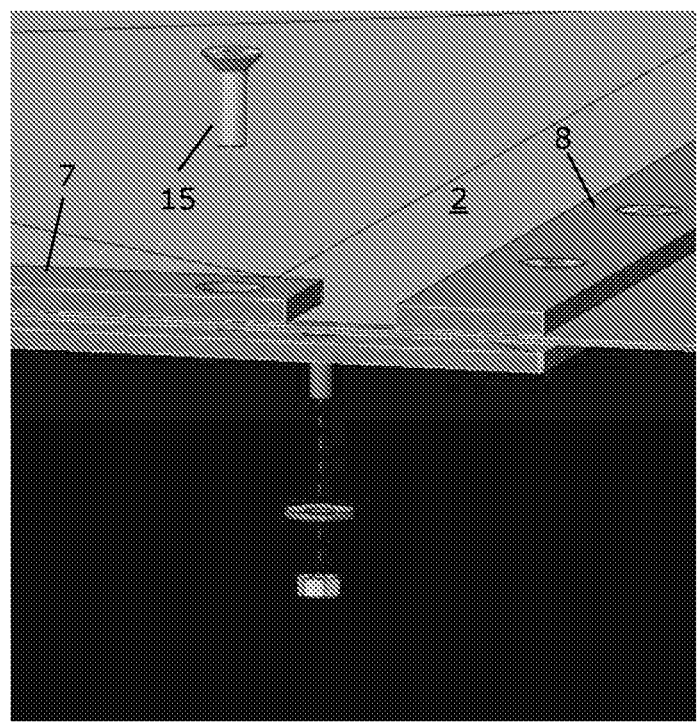

FIGS. 6-7 illustrate further details of the frame about the release wall portion. In this view it is clearly illustrated that the rigid frame 14 inside the cabinet is joined with the four outer profiles 7, 8 by screws 15, rivets or similar mechanical fasteners through the panel to such that the blank 6 is held between the profiles and the frame or between the profiles and the panel 2. In this way, the inner lining and the blank are replaceable if the release wall portion is released.

The invention claimed is:

1. A cabinet comprising:
   an outer wall encapsulating an internal space dimensioned to receive electronic components, the outer wall having a rupture line forming a release wall portion, wherein rupturing of the rupture line in response to an increased pressure in the internal space causes the release wall portion to be released and thereby defines an opening forming an arc-vent for the internal space; and
   a ventilation-open inner lining arranged in the internal space and exposed at the opening when the release wall portion is released, wherein the ventilation-open inner lining is dimensioned to prevent entry of objects through the opening into the internal space.

2. The cabinet according to claim 1, wherein a rigid frame extends around the ventilation-open inner lining.

3. The cabinet according to claim 1, wherein the ventilation-open inner lining forms a mesh.

4. The cabinet according to claim 3, wherein the mesh size provides openings of less than 25 square centimeters.

5. The cabinet according to claim 1, wherein the ventilation-open inner lining is arranged directly adjacent the outer wall.

6. The cabinet according to claim 1, wherein the ventilation-open inner lining provides a higher resistance against deflection than the release wall portion.

7. The cabinet according to claim 1, wherein the release wall portion is deflectable into contact with the ventilation-open inner lining without rupturing the rupture line.

8. The cabinet according to claim 1, wherein the release wall portion and at least a part of the outer wall is formed in one blank of a sheet material.

9. The cabinet according to claim 8, wherein the rupture line is formed as a reduced material thickness of the blank.

10. The cabinet according to claim 8, wherein the blank is attached replaceably to the remaining part of the outer wall.

11. The cabinet according to claim 1, wherein the electronic components comprise one or more of a low voltage converter or a switch gear.

12. The cabinet according to claim 1, further comprising:
   a support structure arranged to support the outer wall (i) on ground or (ii) by suspending the outer wall on a wall, wherein the release wall portion has a horizontal orientation when the outer wall is supported by the support structure.

13. The cabinet according to claim 1, wherein the release wall portion forms a central portion within a peripheral portion, and wherein the distance from the central portion to the ventilation-open inner lining is larger than the distance from the peripheral portion to the ventilation-open inner lining.

14. A wind turbine comprising:
   one or more electronic components; and
   a cabinet comprising:
      an outer wall encapsulating an internal space, wherein the one or more electronic components are disposed within the internal space, the outer wall having a rupture line forming a release wall portion, wherein rupturing of the rupture line in response to an increased pressure in the internal space causes the release wall portion to be released and thereby defines an opening forming an arc-vent for the internal space; and
      a ventilation-open inner lining arranged in the internal space and exposed at the opening when the release wall portion is released, wherein the ventilation-open inner lining is dimensioned to prevent entry of objects through the opening into the internal space.

15. A method of constructing a cabinet capable of arc venting, the method comprising:
   forming an outer wall that encapsulates an internal space dimensioned to receive electronic components, wherein forming the outer wall comprises forming a release wall portion that is defined by a rupture line configured to rupture responsive to an increased pressure in the internal space, wherein the release wall portion is configured to release responsive to the rupture to form an arc-vent for the internal space; and
   arranging a ventilation-open inner lining in the internal space such that the ventilation-open inner lining is exposed at the arc-vent when the release wall portion is released, wherein the ventilation-open inner lining is dimensioned to prevent entry of objects through the arc-vent into the internal space.

16. The method of claim 15,
   wherein forming the outer wall comprises attaching a first panel to at least a second panel,
   wherein forming the release wall portion comprises attaching a blank to the first panel to cover an opening defined through the first panel, and
   wherein the release wall portion is defined in the blank.

17. The method of claim 16,
   wherein the blank is attached to an exterior surface of the first panel,
   wherein arranging the ventilation-open inner lining in the internal space comprises attaching the ventilation-open inner lining to an interior surface of the first panel opposite the exterior surface.

18. The method of claim 17,
   wherein attaching the blank to the exterior surface and attaching the ventilation-open inner lining to the interior surface comprises inserting a plurality of mechanical fasteners that extend through corresponding openings of the blank and the ventilation-open inner lining.

19. The method of claim 16, wherein forming the outer wall comprises replacing a third panel with the first panel after a release wall portion of the third panel is released.

20. The method of claim 16, wherein the blank is a first blank, wherein forming the release wall portion comprises replacing a second blank with the first blank after a release wall portion of the second blank is released.

* * * * *